(12) United States Patent
Kozloski et al.

(10) Patent No.: US 10,995,462 B2
(45) Date of Patent: May 4, 2021

(54) AUTONOMOUS MOBILE ATTENUATOR SYSTEM

(71) Applicant: International Business Machines Corporation, Armonk, NY (US)

(72) Inventors: James R. Kozloski, New Fairfield, CT (US); Michael S. Gordon, Yorktown Heights, NY (US); Ashish Kundu, Elmsford, NY (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 237 days.

(21) Appl. No.: 16/156,047

(22) Filed: Oct. 10, 2018

(65) Prior Publication Data

US 2020/0115863 A1    Apr. 16, 2020

(51) Int. Cl.
*E01F 13/12*    (2006.01)
*G05D 1/00*    (2006.01)
*G08G 1/16*    (2006.01)

(52) U.S. Cl.
CPC .......... *E01F 13/12* (2013.01); *G05D 1/0055* (2013.01); *G05D 1/0088* (2013.01); *G08G 1/16* (2013.01); *G05D 2201/0213* (2013.01)

(58) Field of Classification Search
CPC ..... E01F 13/12; G05D 1/0055; G05D 1/0088; G05D 2201/0213; G08G 1/16
See application file for complete search history.

(56) References Cited

U.S. PATENT DOCUMENTS

| 3,876,185 A | 4/1975 | Welch |
| 5,957,616 A | 9/1999 | Fitch |
| 6,098,767 A | 8/2000 | Unrath |
| 6,293,727 B1 * | 9/2001 | Albritton ............... B60R 19/00 256/13.1 |
| 6,581,992 B1 | 6/2003 | Gertz |

(Continued)

FOREIGN PATENT DOCUMENTS

WO    2004094187 A2    11/2004

OTHER PUBLICATIONS

Construction Equipment, CDOT Tests Self-Driving Work Zone Vehicle: Video, Aug. 21, 2017, Construction Equipment, https://www.constructionequiprnent.corn/cdot-tests-self-driving-work-zone-vehicle-video (Year: 2017).*

(Continued)

*Primary Examiner* — Yazan A Soofi
*Assistant Examiner* — Naeem Taslim Alam
(74) *Attorney, Agent, or Firm* — Peter K. Suchecki (57) ABSTRACT

Aspects of the present disclosure relate to an autonomous mobile attenuator system for mitigating vehicular collisions. The system includes one or more mobile attenuators that receive data indicating a need for deployment from one or more sensors. The one or more mobile attenuators perform a collision risk assessment on the received data to determine a probability of a potential vehicle collision. The one or more mobile attenuators determine the probability of the potential vehicle collision exceeds a predetermined risk threshold value. The one or more mobile attenuators determine a predicted location for the potential vehicle collision. The one or more mobile attenuators proceed to the predicted location to mitigate the potential vehicle collision.

20 Claims, 6 Drawing Sheets

(56) References Cited

U.S. PATENT DOCUMENTS

| | | | |
|---|---|---|---|
| 6,702,513 | B1 | 3/2004 | Raupach |
| 6,905,282 | B2 | 6/2005 | Leonhardt |
| 7,168,880 | B2 | 1/2007 | Kennedy, Jr. |
| 9,547,989 | B2 | 1/2017 | Fairfield |
| 9,754,325 | B1 | 9/2017 | Konrardy |
| 2004/0021294 | A1* | 2/2004 | Carlsson ............... B60R 19/00 280/486 |
| 2006/0151971 | A1* | 7/2006 | Buehler ............... B60D 1/30 280/446.1 |
| 2015/0166059 | A1 | 6/2015 | Ko |
| 2016/0304028 | A1* | 10/2016 | Hathaway ............... G08G 1/04 |
| 2016/0362045 | A1 | 12/2016 | Vegt |
| 2017/0192437 | A1 | 7/2017 | Bier |
| 2019/0088140 | A1* | 3/2019 | Sheckler ............... G08G 1/20 |
| 2019/0193734 | A1* | 6/2019 | Ekl ............... G01C 21/3407 |

OTHER PUBLICATIONS

Albin, D. "AASHTO Manual for Assessing Safety Hardware (MASH)," FHWA Resource Center, U.S. Department of Transportation, Federal Highway Administration, Mar. 2, 2017, Phoenix, Arizona, 19 pgs.

Curtiss, A. "Offramp Crash Cushions are Making an Impact on Safety : City Smart / How to thrive in the urban environment of Southern California," http://articles.latimes.com/1996-01-19/local/me-26304_1_crash-cushions, Jan. 19, 1996, 3 pgs.

Impact Absorption, "Absorb 350™," X-Tenuator Brochure, http://www.impactabsorption.com/impact-attenuators.html, printed Jul. 23, 2018, 3 pgs.

Mell et al., "The NIST Definition of Cloud Computing," Recommendations of the National Institute of Standards and Technology, U.S. Department of Commerce, Special Publication 800-145, Sep. 2011, 7 pgs.

RoadX Accelerating Technology, "Autonomous Impact Protection Vehicle", https://royaltruckandequipment.com/wp-content/uploads/2016/07/AIPV-CDOT-Deploy-World%E2%80%99s-First-Self-Driving-Work-Zone-Vehicle.pdf, 2 pgs., printed Jul. 23, 2018.

Ross Jr. et al., "National Cooperative Highway Research Program Report 350, Recommended Procedures for the Safety Performance Evaluation of Highway Features," Transportation Research Board, National Research Council, 1993, 74 pgs.

Royal Truck & Equipment, "Scorpion Truck Mounted Attenuator Impact Video," https://www.youtube.com/watch?v=4Y-6Nax5pXo, published Dec. 14, 2009, 2 pgs.

Wikipedia, "Impact attenuator," https://en.wikipedia.org/wiki/Impact_attenuator, printed Jul. 23, 2018, 3 pgs.

YouTube, "Texas man stops woman, 94, driving wrong way down highway," https://www.youtube.com/watch?=ISdxy9EjYrg, 2 pgs., published Aug. 28, 2018.

* cited by examiner

AUTONOMOUS MOBILE ATTENUATOR SYSTEM

BACKGROUND

The present disclosure relates generally to the field of vehicle collision safety mechanisms, and more specifically, to an autonomous mobile attenuator system for reducing the risk of injury during an automobile accident.

Automobile accidents involving a vehicle striking another object are a frequent occurrence on highways and roads. In many instances, an automobile accident occurring at high speed results in serious injury or even death to the occupants of the vehicle. To reduce injury occurring from automobile accidents, specifically those involving collisions with barriers, stationary construction vehicles, and the like, vehicle impact attenuators are typically used. Vehicle impact attenuators, also known as fitch barriers, often consist of sand filled barrels placed in a linear or triangular arrangement at the end of a guard rail between a highway and an exit lane along the most probable line of impact. The impact attenuators in the front of the arrangement typically contain the least amount of sand, with each successive barrel containing more, so that when a vehicle collides with the barrels they shatter, the kinetic energy of the vehicle is dissipated by scattering the sand, and the vehicle decelerates smoothly instead of violently striking a solid obstruction. This method of dissipating the kinetic energy of the vehicle using impact attenuators significantly reduces risk of injury to the occupants.

SUMMARY

Embodiments of the present disclosure include an autonomous mobile attenuator system for mitigating potential vehicular collisions. The system may include one or more mobile attenuators, wherein each of the one or mobile attenuators includes a processor. The processor is configured to execute steps of a method. The processor may receive, from one or more sensors, data indicating an estimation of need for deployment of the one or more mobile attenuators. The processor performs a collision risk assessment on the data to determine a probability of a potential vehicle collision. If the probability of the potential vehicle collision exceeds a predetermined risk threshold value, the processor will deploy the one or more mobile attenuators to a predicted location to mitigate the potential vehicle collision.

Embodiments of the present disclosure may be directed toward a method for deploying one or more mobile attenuators of an autonomous mobile attenuator system to mitigate potential vehicular collisions. One or more mobile attenuators may receive data indicative of an errant vehicle from one or more sensors. The one or more mobile attenuators may perform a collision risk assessment on the data to determine a probability of a potential vehicle collision. The one or more mobile attenuators may determine the probability of the potential vehicle collision exceeds a predetermined risk threshold value. The one or more mobile attenuators may deploy and proceed to a predicted location to mitigate the potential vehicle collision.

Embodiments of the present disclosure may be directed toward a computer program product for mitigating a vehicular collision using an autonomous mobile attenuator system. The computer program product includes a computer readable storage medium having program instructions embodied therewith, the program instructions executable by a processor to cause the processor to receive from one or more sensors, data indicating an estimation of need for deployment of one or more mobile attenuators. The processor may perform a collision risk assessment on the data to determine a probability of a potential vehicle collision. If the probability of a potential vehicle collision exceeds a predetermined risk threshold value, the processor will deploy the one or more mobile attenuators to a predicted location to mitigate the potential vehicle collision.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate to the field of vehicle collision safety mechanisms, and more particularly to an autonomous mobile attenuator system for reducing the risk of injury during vehicle collisions. While the present disclosure is not necessarily limited to such applications, various aspects of the disclosure may be appreciated through a discussion of various examples using this context.

Impact attenuators or barriers are often placed in predicted positions along a road to reduce the amount of automobile accidents specifically involving collisions with stationary barriers, construction vehicles, and the like. Impact attenuators may utilize different means to intercept and stop a vehicle in motion. Vehicle impact attenuators, also known as fitch barriers, often consist of weighted barrels placed in a linear or triangular arrangement at the end of a guard rail between a highway and an exit lane along the most probable line of impact.

The impact attenuator is typically filled with a dispersible material, such as sand, gravel, or liquid. Impact attenuators may be categorized by the method used to dissipate kinetic energy. Early models use momentum transfer to stop a vehicle. The impact attenuators would be placed in successive rows where momentum of an errant vehicle is transferred to the dispersible material when the impact attenuator is struck during a collision, reducing the speed of the impacting vehicle such that the vehicle eventually stops.

Newer versions of impact attenuators use alternative methods to slow and/or stop a vehicle, such as material deformation or friction. For example, some impact attenuators use crushable materials that create a crumple zone for absorbing energy. Other types of attenuators use a corrugated steel guard rail section or split a steel box beam. However, these various examples of impact attenuators fail to be mobile or autonomous, such that the attenuator can move to various locations without the need of human intervention.

Embodiments of the present disclosure provide an autonomous mobile attenuator system that deploys one or more mobile attenuators to an area determined to have a high risk of a vehicle collision. The system includes one or more sensors that send data to the mobile attenuators to be analyzed for risk of a potential vehicle collision. If a predetermined risk threshold is exceeded, the system deploys the mobile attenuators to a predicted location (e.g., GPS coordinates) associated with the potential vehicle collision. When at the predicted location, the mobile attenuators may arrange in a pattern to best mitigate the potential vehicle collision. This pattern may be any suitable pattern (e.g., triangular, linear, etc.) that efficiently dissipates the kinetic energy (e.g., disperses the impact force over time) of an errant vehicle when the one or more mobile attenuators are struck.

In some embodiments, the autonomous mobile attenuator system may be deployed to redirect an errant driver to prevent a potential vehicle collision. In this way, one or more mobile attenuators may intercept (e.g., stop, slow, or redirect) a vehicle at any point along the path leading to the predicated location of the potential vehicle collision. In other words, the attenuator system may be deployed to create a mobile barrier that causes the driver to reduce his speed or turn onto a safer road. For example, if a driver is heading the wrong way on a one-way street, the mobile attenuator system may deploy a plurality of impact attenuators that line up to gradually direct the driver into a lane from which the driver can be forced onto another street.

Figure 1:
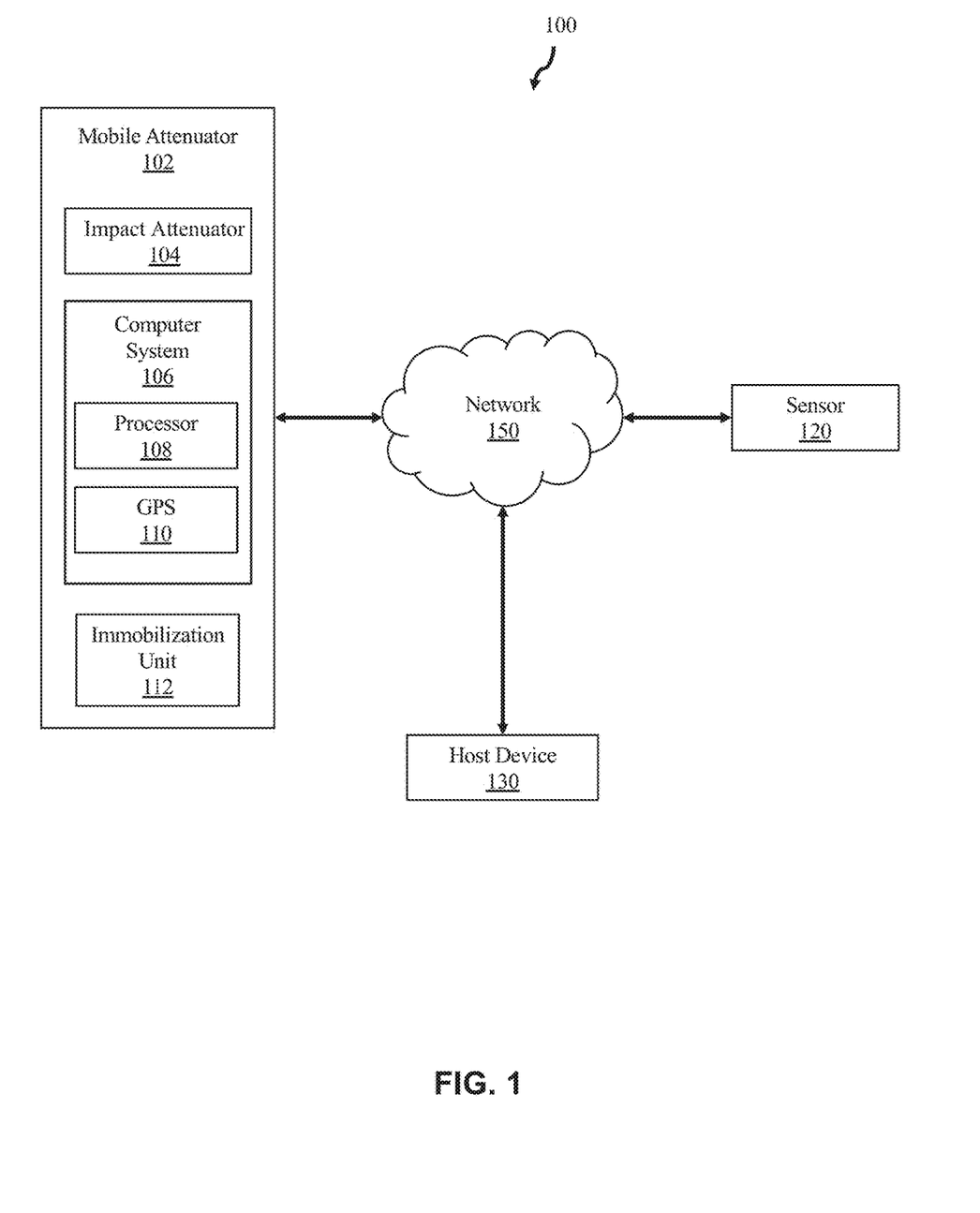
FIG. 1 illustrates a block diagram of an autonomous mobile attenuator system, in accordance with embodiments of the present disclosure.

Referring now to FIG. 1, shown is a block diagram of an autonomous mobile attenuator system 100, in accordance with embodiments of the present disclosure. In the illustrative embodiment, the autonomous mobile attenuator system 100 includes one or more mobile attenuators 102, one or more sensors 120, and one or more host devices 130 communicatively coupled via a network 150. The network 150 may be any type of computing network, such as a cloud computing network.

Figure 5:
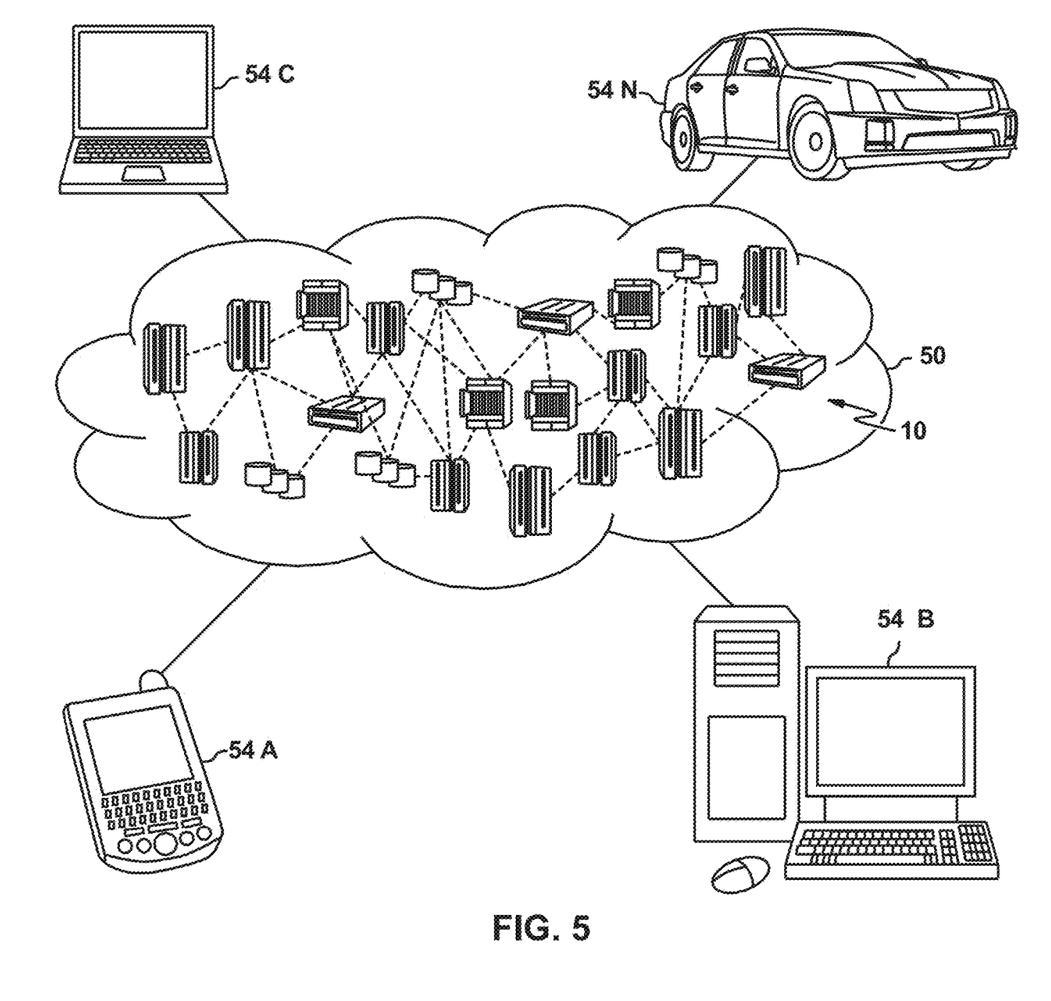
FIG. 5 depicts a cloud computing environment, in accordance with embodiments of the present disclosure.
Figure 6:
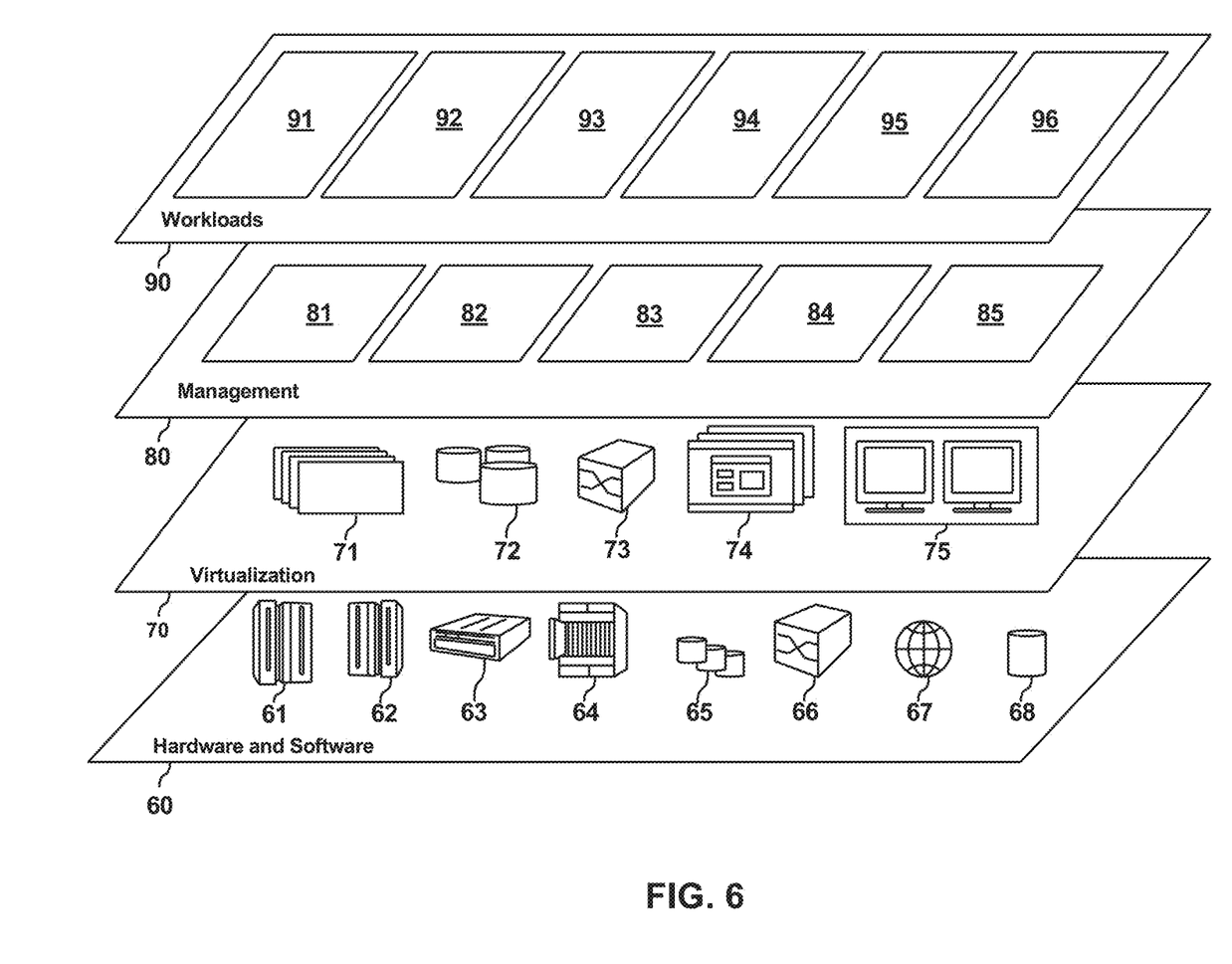
FIG. 6 depicts abstraction model layers, in accordance with embodiments of the present disclosure.

The network 150 may be substantially similar to, or the same as, network 50 described in FIG. 5 and FIG. 6. In some embodiments, the network can be implemented using any number of any suitable communications media. For example, the network may be a wide area network (WAN), a local area network (LAN), an internet, or an intranet. In certain embodiments, the various systems may be local to each other, and communicate via any appropriate local communication medium. For example, the mobile attenuator 102 may communicate with sensor 120 and the host device 130 using a local area network (LAN), one or more hardwire connections, a wireless link or router, or an intranet. In some embodiments, the various systems may be communicatively coupled using a combination of one or more networks and/or one or more local connections. For example, the mobile attenuator 102 may communicate with a docking station (not shown) using a wireless network (e.g., a router), and the docking station may be hardwired (e.g., connected with an Ethernet cable) to the host device 130.

Figure 4:
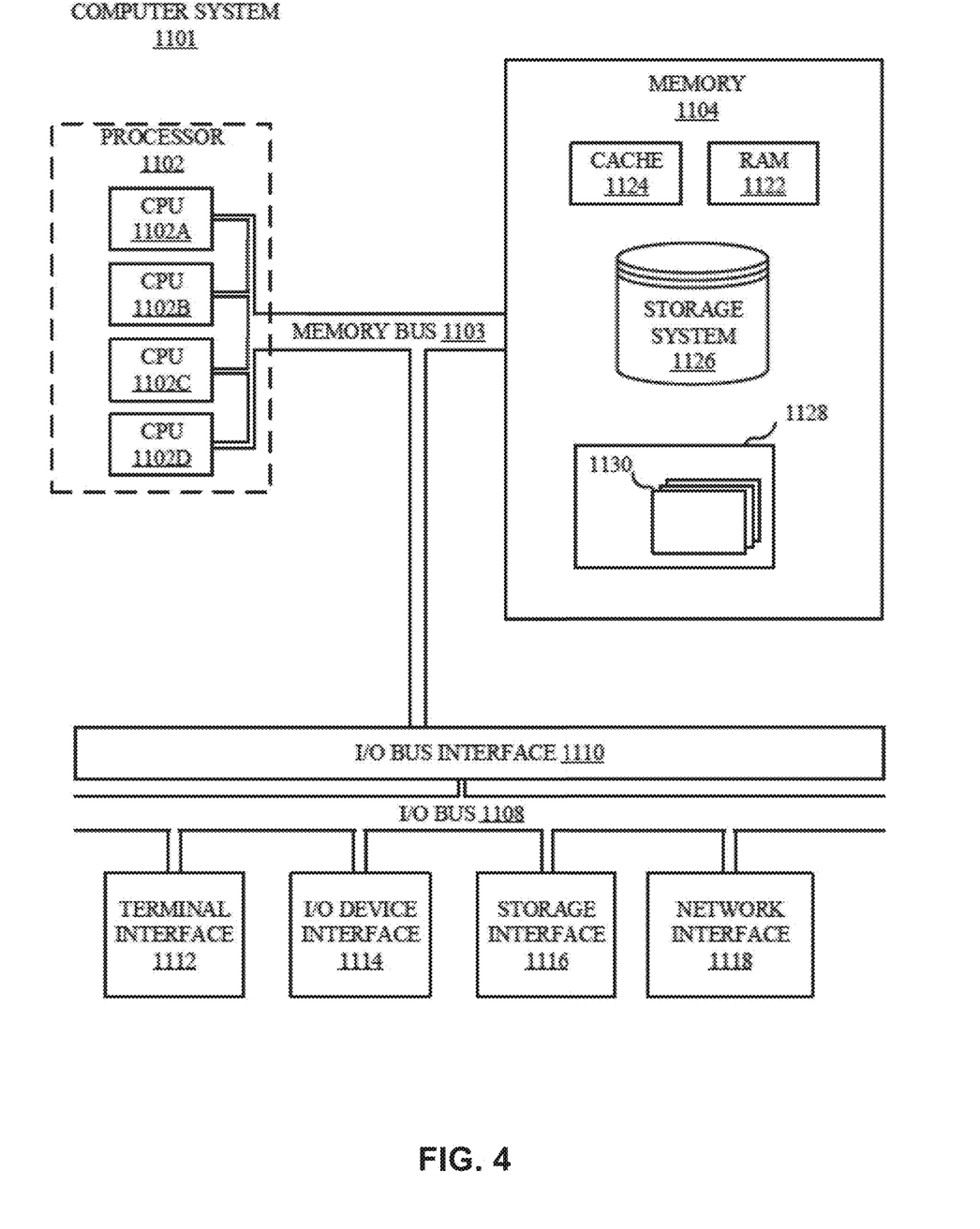
FIG. 4 illustrates a high-level block diagram of an example computer system that may be used in implementing one or more of the methods, tools, and modules, and any related functions, described herein, in accordance with embodiments of the present disclosure.

The host device 130 may be any type of computer system and may be substantially similar to computer system 1101 of FIG. 4. In some embodiments, the host device 130 may allow for the manual activation of the system 100 when deployment is determined necessary by a user. For example, the deployment may be initiated from a remote facility (e.g., a police car, a 911 call center, an authorized helicopter, an authorized drone, or combination of modalities that are in "agreement" that an action may be taken, etc.) by a user utilizing the host device 130. Once deployment is initiated by a user, the autonomous nature of the autonomous mobile attenuator system can ensue. The deployment may be based on the need to intercept or redirect a vehicle (e.g. a vehicle travelling the wrong way), e.g., to prevent a head on collision.

The host device 130 may provide updates to the mobile attenuator 102. For example, the host device 130 may send updated statistical information generated from a history of collisions associated with a specific location. This statistical information may be used to adjust algorithms used for collision risk assessments and criteria for deployment of the mobile attenuator 102. The host device 130 may send the mobile attenuator 102 current traffic information and other geographic data obtained from an internet database or website to aide in predicting a location of a potential vehicle collision.

Sensor 120 may be any type of sensor configured to generate data to be analyzed for risk indicative of a potential vehicle collision. For example, data may be generated from motion sensors placed along a highway, such that the sensors 120 can determine a vehicle going in the wrong direction, the location of an accident, or any type of road hazard, etc.

In some embodiments, sensor 120 may be an optical or biometric sensor that can detect cognitive function of a driver of a vehicle. For example, sensor 120 may be a dashboard camera located within a vehicle and may detect facial expressions indicating a drowsy driver. The dashboard camera may be linked to the autonomous mobile attenuator system 100, such that data can be transmitted to the system 100 to be analyzed for risk of a potential accident. If the combination of all data received from each sensor 120 results in a cumulative risk that is determined to be above a threshold risk value, the system 100 may deploy one or more mobile attenuators 102 to mitigate a potential vehicle collision.

Sensor 120 may include various smart devices. For example, data generated from sensor 120 may include biometric data obtained from a communicatively coupled wearable unit, such as a smartwatch. Data from a driver's smartwatch may be used to track biometric data such as pulse rate or blood sugar level, which may be additionally used to indicate the current state of the driver. In some embodiments, other devices such as a smartphone may further provide data to be used for risk assessment of a potential accident. For example, data taken from a driver's smartphone calendar may indicate they have been awake for a long period of time based on scheduling, appointments, events, etc. Further, drug prescription data may be obtained via an internet database, indicating a driver may be under the influence of prescription drugs. If known, the estimated cognitive state (e.g., drunk, drowsy, distracted, under the influence of prescription medicine) of the errant driver (e.g. driver travelling the wrong way on a highway) may be used to change characteristics of the deployment of the mobile attenuator 102 (e.g., how, where, and when the deployment takes place). In some embodiments, the cognitive state of a driver that may potentially become an errant driver may be further predicted through social network monitoring. For example, if a user (prior to driving) writes on a message board or social networking site that they are planning a long trip, tired, or upset, the system 100 may utilize this information when determining the cognitive state of the driver.

In some embodiments, sensor 120 may comprise impact sensors to detect various vehicle activity. For example, an impact sensor may detect if the vehicle has brushed a sidewall on a highway. In another embodiment, sensor 120 may comprise gyroscope or inertial sensors to detect sporadic driving by a driver.

Mobile attenuator 102 may be any type of mobile vehicle configured to transport an impact attenuator 104. In one embodiment, the mobile attenuator 102 is a dedicated self-driving vehicle, such as a truck, car, or drone. The impact attenuator 104 may be any type of impact barrier. For example, the impact attenuator 104 may be shaped as a barrel, wherein barrel may be filled with sand, gravel, or liquid in order to dissipate energy when the impact attenuator 104 is struck by a vehicle. The impact attenuator 104 may include curved rigid tubular structural members that are designed to buckle upon application of forces resulting from vehicular impact.

In alternative embodiments, the impact attenuator 104 may contain a bladder, wherein the bladder deflates and absorbs the force of a collision when struck by a vehicle. The impact attenuator 104 may include a frame adapted to be mounted on the mobile attenuator 102. For example, a sliding mechanism mounted on the frame may be configured to allow the impact attenuator 104 to slide in response to a vehicle impact. The sliding mechanism may include a steel cable or strap disposed in an angled slot or tube, such that kinetic energy created when the impact attenuator 104 is struck is converted into heat energy by utilizing friction, thereby slowing an errant vehicle. In an alternative embodiment, the frame disposed on the mobile attenuator 102 may include collapsible telescopic energy absorbing members (e.g., springs, hydraulic shock absorbers, etc.) positioned between the slider and the frame to absorb energy as the slider telescopes relative to the frame.

In one embodiment, the association between the mobile attenuator 102 and the impact attenuator 104 may be temporary. In this arrangement, the impact attenuator 104 is deployed by the mobile attenuator 102, and the mobile attenuator 102 is configured to move away from the impact attenuator 104 to prevent risks associated with collision of the mobile attenuator's 102 mechanical components upon impact with an errant vehicle. For example, mobile attenuator 102 may include multiple impact attenuators 104 that may be placed by the mobile attenuator in stationary positions along a highway. Once placed in an appropriate position to mitigate a potential collision, the mobile attenuator 102 may move away from the impact attenuators 104, allowing for only the impact attenuators 104 to be struck by a vehicle.

In some embodiments, the impact attenuator 104 is permanently secured to the mobile attenuator 102. For example, the impact attenuator 104 itself is mobile and may include computer system 106, a motor and a set of retractable wheels, such that impact attenuator 104 may position itself autonomously. Once positioned, the wheels on the impact attenuator 104 may retract allowing the impact attenuator to remain in a stationary position. It is contemplated that the computer system, motor and wheels are disposed in an area where the least damage will be incurred when the impact attenuator 104 is struck by a vehicle.

In another embodiment, the impact attenuator 104 is adjustable in height, such that the center of gravity of the dispersible mass (sand, water, etc.) within the impact attenuator may be placed at the same height of the center of gravity of an errant vehicle. In this way, the impact attenuator 104 can be positioned to the height in which the impact attenuator will most efficiently stop or slow the errant vehicle. This may be done by utilizing a mechanical device disposed on the impact attenuator, such as a hydraulic lifting mechanism which is communicatively coupled to the mobile attenuator 102. For example, the type of errant vehicle may be determined during the risk assessment performed by computer system 106 (or by host device 130). Once determined, the mobile attenuator 102 may adjust the height of a coupled impact attenuator 104 to match the predicted center of gravity of the determined type of errant vehicle. In some embodiments, the height of a particular impact attenuator 104 may be based on its deployment position within a group of impact attenuators 104 and the shape of the deployment. For example, if multiple impact attenuators 104 are deployed in a linear fashion, each row of impact attenuators 104 may have a different deployment height (e.g., the front row may be the highest, followed by the second row, and so on).

Computer system 106 may be substantially similar to, or the same as, computer system 1101 described in FIG. 4. The computer system 106 includes a processor 108 and may include a global positioning system (GPS) 110. The processor is configured to perform risk computation analysis on data received from sensor 120 and host device 130. The risk computation may include a collision risk assessment to determine the probability of a potential vehicular collision. The risk computation may be based on the current traffic data, data indicating the type and location of an errant vehicle as determined by one or more sensors 120, geographic data, weather data, road surface conditions (e.g., icy, rain soaked, flooded, etc.) the time of the day, etc. The processor 108 may determine how much risk an errant vehicle would create to lead to a potential vehicle collision (e.g., the likelihood of the vehicle causing an accident and the potential damage of the resulting accident). Based on that risk, the processor 108 dynamically determines the amelioration method to use or the extent to which a method is used to stop, or slow, the errant vehicle from moving further.

Further, it is contemplated that computer system 106 may include an artificial intelligence system that can learn based on a history of accidents, success in ameliorating accidents (including deaths and damages), and various uses during ambient conditions of weather, road conditions, driver state, etc. For example, the artificial intelligence system can include one or more artificial neural networks. As more data is learned by the system, such as data related to accident history, successful deployments of the attenuators, and unsuccessful deployments, the weights of the neural network can be adjusted, automatically, by the processor. Over time, the system can become more accurate in determining when the deploy the impact attenuators, where to deploy the impact attenuators, and what pattern to use based on, among other things, the type and size of errant vehicle, the type of driver condition (e.g., drowsy, drunk, etc.), the weather, traffic patterns, and road surface conditions (e.g., icy, rain soaked, flooded, etc.).

GPS 110 may be included to monitor the location of each of the one or more mobile attenuators 102 linked to the system 100. In this way, if the determined risk of a potential vehicle collision is high, multiple mobile attenuators may be used to mitigate the collision. By utilizing the GPS location of each mobile attenuator 102, the attenuators in the closest position to the potential vehicle collision location can be deployed (e.g., from a docking station on the side of a highway) to quickly mitigate the potential collision. Further, GPS 110 may be utilized to position each mobile attenuator in a specific pattern during placement. Although the phrase GPS location is used herein, other means of location may be employed, including the integration of car-to-car distance information, visual information based on computer vision systems, etc., to improve positional accuracy. Other examples of positional augmentation systems include the European Geostationary Navigation Overlay Service (EGNOS), Differential GPS (DGPS), inertial navigation systems (INS), vehicular LIDAR systems, and the like.

In some embodiments, mobile attenuator 102 may further include an immobilization unit 112. The immobilization unit 112 is configured to immobilize, or partially immobilize, an errant vehicle. In one embodiment, the immobilization unit 112 is a tack strip configured to pierce the errant vehicle's tires. In this way, the mobile attenuator may deploy the immobilization unit 112 to aide in slowing or stopping a vehicle. In another embodiment, the immobilization unit 112 is configured as a chemical liquid that is dispersed and immediately solidifies when contacting the tires of the errant vehicle. In this way, the immobilization unit 112 may jam the wheels of the errant vehicle thereby slowing the vehicle prior to impacting the mobile attenuator 102.

Figure 2:
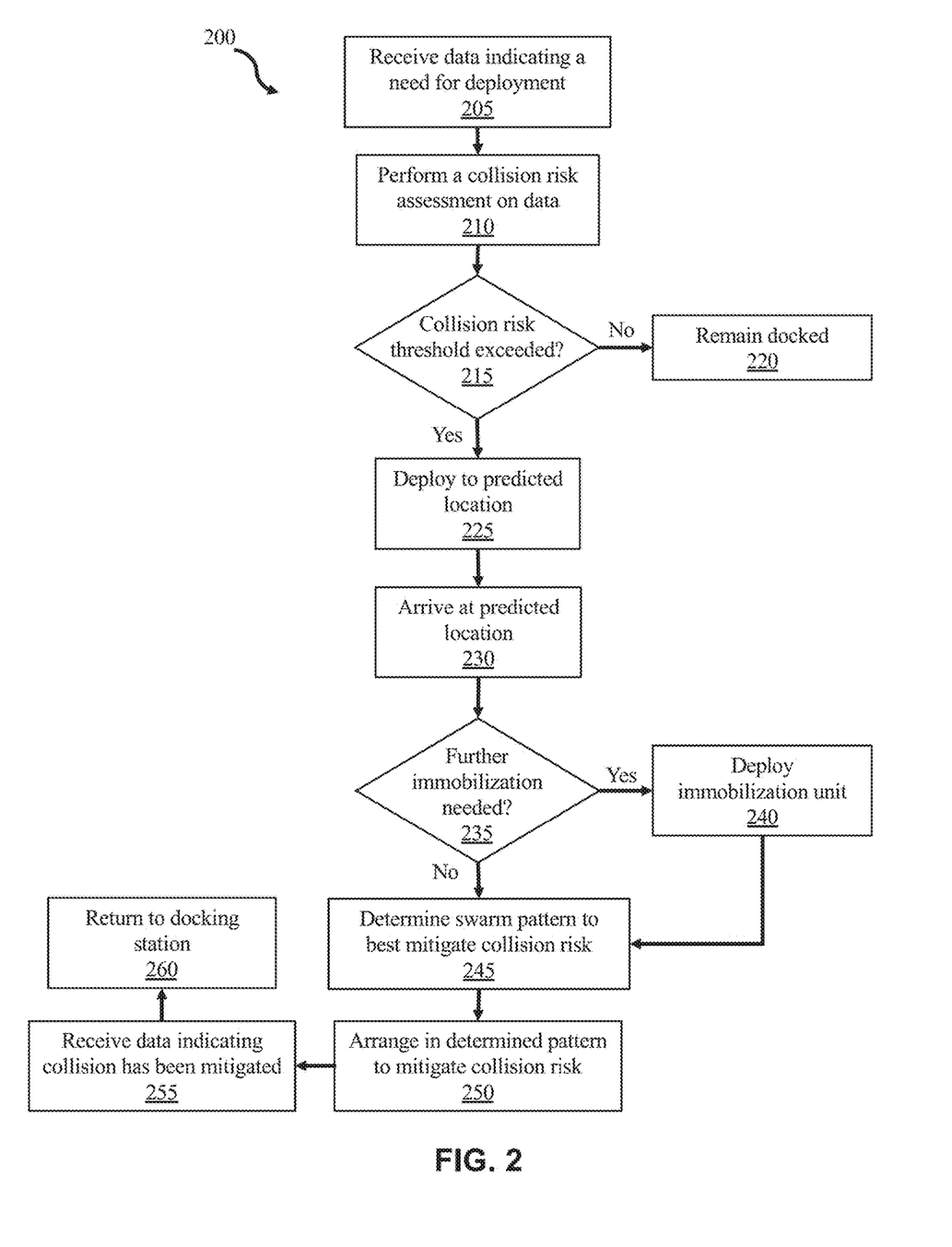
FIG. 2 illustrates a flow diagram of an example method for deployment of one or more mobile attenuators, in accordance with embodiments of the present disclosure.

Referring now to FIG. 2, shown is a flow diagram of an example process 200 for deployment of one or more mobile attenuators, in accordance with embodiments of the present disclosure. The process 200 may be performed by processing logic that comprises hardware (e.g., circuitry, dedicated logic, programmable logic, microcode, etc.), software (e.g., instructions run on a processor to perform hardware simulation), firmware, or a combination thereof. In some embodiments, the process 200 is a computer-implemented process. The process 200 may be performed by a processor 108 exemplified in FIG. 1. In some embodiments, a processor of a host device (e.g., host device 130 in FIG. 1) may perform the process 200.

The process 200 begins by the processor receiving data indicating an estimation of need for deploying one or more mobile attenuators to a location. This is illustrated by step 205. The data indicating an estimation of need is received by the processor from one or more sensors communicatively coupled to the one or more mobile attenuators. For example, a vehicle traveling in the wrong direction on a highway will activate the one or more sensors to collect data on the vehicle. The data received by the processor will be assessed to determine a need to stop or redirect the vehicle.

Once the processor receives the data from the one or more sensors, the processor analyzes the estimation of need for a potential collision risk. This is illustrated in step 210. In one embodiment, the received data may be analyzed by the processor by performing a risk-based computation. For example, the processor may utilize current traffic patterns obtained from the sensors or via information obtained from the host device.

The process 200 continues by determining if the collision risk exceeds a predetermined threshold. This is illustrated in step 215. If the collision risk is determined to be below the threshold, the one or more mobile attenuators will not be deployed (e.g., remain docked in a docking station). This is illustrated in step 220. For example, if a sensor detects movement from an animal or another small object, the risk of a vehicle collision may be minimal and fall under the predetermined risk threshold. Thus, the processor would determine that there is no need to deploy any mobile attenuators. Alternatively, if the processor determines that the collision risk exceeds the predetermined risk threshold, then the processor will deploy one or more mobile attenuators to a predicted location associated with the potential vehicle collision determination. This is illustrated in step 225. In some embodiments, the deployed mobile attenuators may intercept (e.g., stop, slow, or redirect) an errant vehicle at any point along a path traveled to the predicted location of the potential vehicle collision. For example, the mobile attenuators may be deployed to redirect an errant vehicle prior to the predicted location of the vehicle collision, such that no collision occurs. In some embodiments, the predicated location may be determined through the use of GPS where the mobile attenuator further refines the position/placement of the impact attenuators via optical sensors or other positioning systems (e.g., trilateration, RSSI positioning, etc.)

Based on the collision risk, the processor dynamically determines the amelioration method to use or the extent to which a method is used to stop, slow, or redirect the errant vehicle from moving further. For example, the determined speed and size of the errant vehicle will factor into how many mobile attenuators are deployed and what pattern they should be deployed in. If sensors indicate that the errant vehicle is traveling at a high speed, more mobile attenuators will be needed to stop or slow the errant vehicle. In some embodiments, the source of the data may further dictate the type of response the mobile attenuator system may use. For example, if a police department indicated an errant vehicle is a threat, the immobilization unit (e.g., tack strip) may be used.

Additionally, in some embodiments the processor may determine what types of mobile attenuators to deploy based on the collected data. For example, if the size of the errant vehicle is determined to be large based on the collected data, a specific type of mobile attenuator (e.g., a mobile attenuator having a heavier sand filled impact attenuator) may be deployed to intercept the larger vehicle. Further, the number of mobile attenuators needed for deployment and the number of mobile attenuators available may be factored in when determining the appropriate deployment plan. For example, if the processor determines that only mobile attenuators with lighter impact attenuators are available, more mobile attenuators may be deployed to stop the errant vehicle.

The process 200 continues by instructing the mobile attenuators to arrive at the predicted location of the potential vehicle collision, as determined by the risk computation. This is illustrated in step 230. In some embodiments, each mobile attenuator may be equipped with an immobilization unit to further mitigate a potential collision. The immobilization unit may be used to slow the errant vehicle prior to coming in contact with the one or more mobile attenuator. In such an embodiment, the process 200 continues by determining if further immobilization is needed to stop an errant vehicle. This is illustrated in step 235. If the processor determines that the collision risk is significant, the mobile attenuator will deploy the immobilization unit. This is illustrated in step 240. For example, a vehicle traveling at a high rate of speed may be slowed by the immobilization unit (e.g., utilizing a chemical liquid or a tack strip) that is deployed in front of the one or more mobile attenuators. However, the immobilization unit may not fully decelerate the vehicle prior to contacting the mobile attenuators, thus the attenuators may still be needed to mitigate a collision.

If further immobilization is determined not to be needed by the processor, then the process 200 continues by determining a swarm pattern to best mitigate the collision risk. This is illustrated in step 245. For example, depending on the number of mobile attenuators deployed relative to the size and speed of the errant vehicle, the processor will determine an appropriate pattern (e.g., a linear or triangular pattern) for placement of the mobile attenuators at the predicated location. Once the swarm pattern is determined, the process 200 continues by arranging the one or more mobile attenuators in the determined pattern. This is illustrated in step 250. The placement of each mobile attenuator may be determined by inter-attenuator communication between each of the mobile attenuators. For example, some mobile attenuators may be equipped with lighter impact attenuators, which will be placed in front of the determined pattern, whereas mobile attenuators containing heavier impact attenuators will be placed near the rear of the pattern in order to properly dissipate the kinetic energy of an errant vehicle. Once the mobile attenuators are in place, they will remain in position until the potential vehicle collision has been mitigated.

The process 200 continues by the mobile attenuators receiving data indicating the potential vehicle collision has been mitigated. This is illustrated in step 255. This data may indicate that the errant vehicle struck the one or more mobile attenuators. If no vehicle collision occurs and the potential vehicle collision is no longer a risk based on received updated data, the process 200 continues by instructing the one or more attenuators to return to a docking station. This is illustrated in step 260. In some embodiments, the docking station may be used to charge an electric battery of the mobile attenuators and further update the system with data gathered from the mobile attenuator during deployment.

In some embodiments, the order of operations for process 200 may vary and additional or fewer steps may be included. For example, in some embodiments, the mobile attenuators may be in motion on a highway prior to determining a need to intercept a vehicle. In such an instance, the mobile attenuators would not be deployed from a docking station. Further, in some embodiments, the mobile attenuators may remain in motion on a highway once a potential collision has been mitigated. Thus, the mobile attenuators may not need to return to a docking station.

Figure 3A:
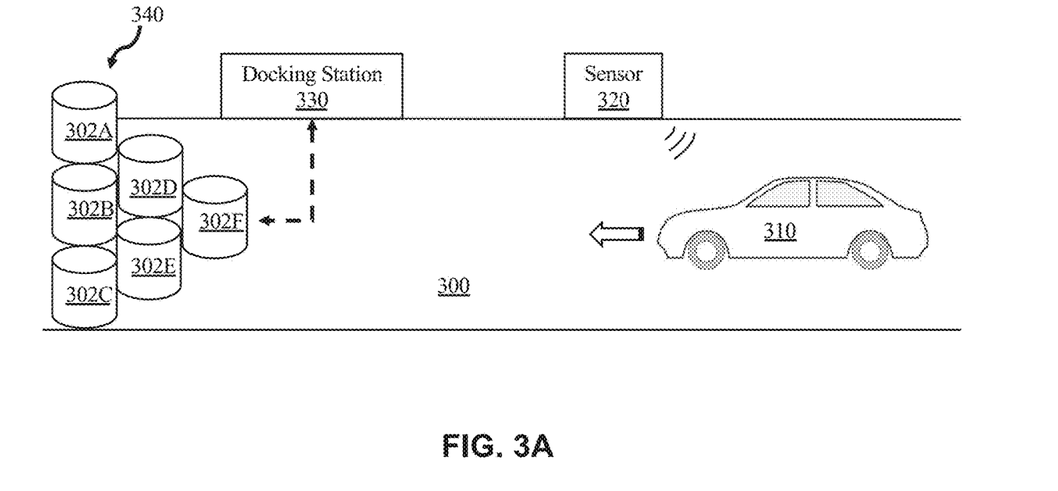
FIG. 3A illustrates an example triangular swarm pattern configuration for multiple mobile attenuators, in accordance with embodiments of the present disclosure.

Referring now to FIG. 3A, shown is an example triangular swarm pattern configuration for multiple mobile attenuators, in accordance with embodiments of the present disclosure. In the illustrative embodiment, swarm pattern 340 includes a set of mobile attenuators 302A-302F (collectively referred to as mobile attenuator 302) arranged in a triangular pattern. Each mobile attenuator 302 receives data from sensor 320 disposed along road 300, indicating that an errant vehicle 310 needs to be intercepted or diverted to mitigate or prevent a vehicle collision. The data received from sensor 320 may include variables of the errant vehicle, such as size, speed, cognition of the driver. Once received, this information is processed by each mobile attenuator 302. If deploying each mobile attenuator 302 is determined to be necessary to mitigate a potential collision risk, each mobile attenuator 302 deploys from docking station 330 to arrive at a determined location where the probability of intercepting the vehicle is the highest. Based on the determined variables received from the sensor 320, each mobile attenuator 302 arranges itself in a determined swarm pattern. For example, mobile attenuators 302A-302F are arranged in a triangular swarm pattern 340 to divert a smaller vehicle 310. It is contemplated that a triangular pattern may be used to divert the errant vehicle to a preferred direction (e.g., right or left) to mitigate damages. In some embodiments, each mobile attenuator 302 may include sensors (e.g., impact sensors) to measure the force when impacted by an errant vehicle. In this way, future swarm patterns could be refined based on what was required (e.g., if the swarm 340 utilized too many or too little attenuators) to stop or slow a vehicle having a certain momentum.

Figure 3B:
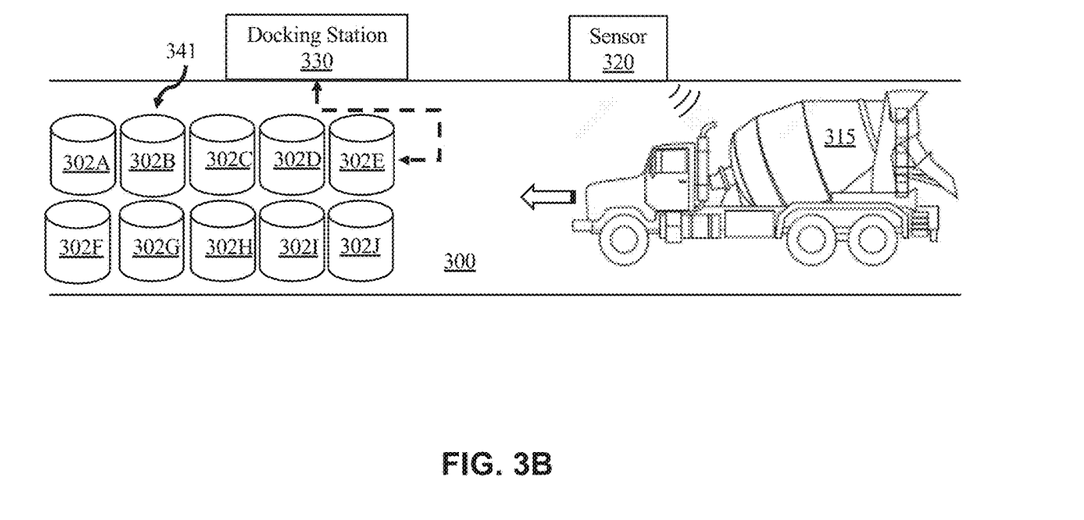
FIG. 3B illustrates an example linear swarm pattern configuration for multiple mobile attenuators, in accordance with embodiments of the present disclosure.

Referring now to FIG. 3B, shown is an example linear swarm pattern configuration for multiple mobile attenuators, in accordance with embodiments of the present disclosure. In the illustrative embodiment, swarm pattern 341 includes a set of mobile attenuators 302A-302J (collectively referred to as mobile attenuator 302) arranged in a linear pattern. Sensor 320 sends data to each mobile attenuator 302 indicating a large errant vehicle 315 is traveling in a wrong direction on road 300. Because the vehicle data indicates a larger errant vehicle, the mobile attenuator 302 deploys from docking station 330 and arranges into a linear swarm pattern 341. In the illustrative embodiment, the arrangement of mobile attenuators 302 are such that the first impact attenuator may contain the least amount of dispersible material, with each successive attenuator containing more, so that when the larger errant vehicle 315 collides with the impact attenuators they shatter, and the kinetic energy is dissipated by scattering the dispersible material and the vehicle 315 decelerates smoothly instead of violently striking a solid obstruction, reducing the risk of injury to the occupants.

Referring now to FIG. 4, shown is a high-level block diagram of an example computer system 1101 (e.g., host device 130, computer system 106, sensor 120, sensor 320, etc.) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 1101 may comprise one or more CPUs 1102, a memory subsystem 1104, a terminal interface 1112, a storage interface 1116, an I/O (Input/Output) device interface 1114, and a network interface 1118, all of which may be communicatively coupled, directly or indirectly, for inter-component communication via a memory bus 1103, an I/O bus 1108, and an I/O bus interface unit 1110.

The computer system 1101 may contain one or more general-purpose programmable central processing units (CPUs) 1102A, 1102B, 1102C, and 1102D, herein generically referred to as the CPU 1102. In some embodiments, the computer system 1101 may contain multiple processors typical of a relatively large system; however, in other embodiments the computer system 1101 may alternatively be a single CPU system. Each CPU 1102 may execute instructions stored in the memory subsystem 1104 and may include one or more levels of on-board cache. In some embodiments, a processor can include at least one or more of, a memory controller, and/or storage controller. In some embodiments, the CPU can execute the process included herein (e.g., process 200).

System memory 1104 may include computer system readable media in the form of volatile memory, such as random access memory (RAM) 1122 or cache memory 1124. Computer system 1101 may further include other removable/non-removable, volatile/non-volatile computer system data storage media. By way of example only, storage system 1126 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 1104 can include flash memory, e.g., a flash memory stick drive or a flash drive. Memory devices can be connected to memory bus 1103 by one or more data media interfaces. The memory 1104 may include at least one program product having a set (e.g., at least one) of program modules that are configured to carry out the functions of various embodiments.

Although the memory bus 1103 is shown in FIG. 4 as a single bus structure providing a direct communication path among the CPUs 1102, the memory subsystem 1104, and the I/O bus interface 1110, the memory bus 1103 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1110 and the I/O bus 1108 are shown as single units, the computer system 1101 may, in some embodiments, contain multiple I/O bus interface units 1110, multiple I/O buses 1108, or both. Further, while multiple I/O interface units are shown, which separate the I/O bus 1108 from various communications paths running to the various I/O devices, in other embodiments some or all of the I/O devices may be connected directly to one or more system I/O buses.

In some embodiments, the computer system 1101 may be a multi-user mainframe computer system, a single-user system, or a server computer or similar device that has little or no direct user interface, but receives requests from other computer systems (clients). Further, in some embodiments, the computer system 1101 may be implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary computer system 1101. In some embodiments, however, individual components may have greater or lesser complexity than as represented in FIG. 4, components other than or in addition to those shown in FIG. 4 may be present, and the number, type, and configuration of such components may vary.

One or more programs/utilities 1128, each having at least one set of program modules 1130 may be stored in memory 1104. The programs/utilities 1128 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 1128 and/or program modules 1130 generally perform the functions or methodologies of various embodiments.

It is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 5, illustrative cloud computing environment 50 is depicted. As shown, cloud computing environment 50 comprises one or more cloud computing nodes 10 with which local computing devices (e.g., host device 130, computer system 106, sensor 120, sensor 320, etc.) used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; risk assessment 93; data analytics processing 94; transaction processing 95; and mobile desktops 96.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding of the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to those skilled in the art. Therefore, it is intended that the following claims be interpreted as covering all such alterations and modifications as fall within the true spirit and scope of the disclosure.

What is claimed is:

1. An autonomous mobile attenuator system, comprising:
   one or more sensors; and
   one or more mobile attenuators communicatively coupled to the one or more sensors, wherein each of the one or more mobile attenuators includes:
   one or more impact attenuators; and
   a processor, wherein the processor is configured to perform a method, the method comprising:
   receiving, from the one or more sensors, data indicating an estimation of need for deployment of the one or more mobile attenuators;
   performing a collision risk assessment on the data received from the one or more sensors, to determine a probability of a potential vehicle collision;
   determining that the probability of the potential vehicle collision exceeds a predetermined risk threshold value;
   determining a predicted location for the potential vehicle collision; and
   deploying the one or more mobile attenuators to an intercept location that is based on the predicted location of the potential vehicle collision, wherein the intercept location is along a path between a current location of a vehicle and the predicted location of the potential vehicle collision.

2. The autonomous mobile attenuator system of claim 1, wherein the method further comprises:
   determining a specific pattern for placement of the one or more mobile attenuators, such that the specific pattern is determined as a highest probability to mitigate the potential vehicle collision; and
   instructing the one or more mobile attenuators to arrange at the predicted location in the determined specific pattern.

3. The autonomous mobile attenuator system of claim 1, wherein the method further comprises:
   depositing the one or more impact attenuators at the predicted location of the potential vehicle collision; and
   adjusting heights of the one or more impact attenuators to minimize damages to a vehicle intercepted by the one or more mobile attenuators.

4. The autonomous mobile attenuator system of claim 1, wherein the method further comprises:
   receiving updated statistical information for the collision risk assessment from a host device; and
   adjusting algorithms for the collision risk assessment and determination criteria for deployment of the one or more mobile attenuators.

5. The autonomous mobile attenuator of claim 1, wherein the method further comprises:
   determining further immobilization is needed to mitigate the potential vehicle collision; and
   deploying an immobilization unit that is temporarily coupled to the one or more mobile attenuators, wherein the immobilization unit is configured to stop a vehicle.

6. The autonomous mobile attenuator system of claim 5, wherein the immobilization unit is a tack strip.

7. The autonomous mobile attenuator system of claim 1, wherein each of the one or more mobile attenuators are configured to communicate between each other.

8. The autonomous mobile attenuator system of claim 1, wherein the method further comprises:
   receiving an indication that the probability of the potential vehicle collision has been mitigated; and
   returning the one or more mobile attenuators to a docking station.

9. A method for deploying one or more mobile attenuators using an autonomous mobile attenuator system to mitigate a potential vehicle collision, the method comprising:
   receiving, by one or more mobile attenuators, data indicative of an errant vehicle from one or more sensors indicating an estimation of need for deployment of the one or more mobile attenuators;
   performing, by the one or more mobile attenuators, a collision risk assessment on the data to determine a probability of a potential vehicle collision;
   determining, by the one or more mobile attenuators, the probability of the potential vehicle collision exceeds a predetermined risk threshold value;
   determining, by the one or more mobile attenuators, a predicted location for the potential vehicle collision; and
   proceeding, by the one or more mobile attenuators, to an intercept location that is based on the predicted location of the potential vehicle collision, wherein the intercept location is along a path between a current location of a vehicle and the predicted location of the potential vehicle collision.

10. The method of claim 9, the method further comprising:
    determining, by the one or more mobile attenuators, a specific pattern for placement of each mobile attenuator, such that the specific pattern is determined as a highest probability to mitigate the potential vehicle collision; and
    arranging, by the one or more mobile attenuators, into the determined specific pattern at the predicted location of the potential vehicle collision.

11. The method of claim 9, the method further comprising:
    depositing, by the one or more mobile attenuators, one or more impact attenuators at the predicted location of the potential vehicle collision; and adjusting, by the one or more mobile attenuators, heights of one or more impact attenuators to minimize damages to one or more vehicles intercepted by the one or more mobile attenuators.

12. The method of claim 9, the method further comprising:
    receiving, by the one or more mobile attenuators, updated statistical information for the collision risk assessment from a host device; and
    adjusting, by the one or more mobile attenuators, algorithms for the collision risk assessment and determination criteria for deployment of the one or more mobile attenuators.

13. The method of claim 9, the method further comprising:
    determining, by the one or more mobile attenuators, further immobilization is needed to mitigate the potential vehicle collision; and
    deploying, by the one or more mobile attenuators, an immobilization unit, wherein the immobilization unit is configured to stop a vehicle.

14. The method of claim 9, the method further comprising:
    receiving, by the one or more mobile attenuators, an indication that the probability of the potential vehicle collision has been mitigated; and
    returning, by the one or more mobile attenuators, to a docking station.

15. A computer program product comprising a computer readable storage medium having program instructions embodied therewith, the program instructions executable by a processor to cause the processor to perform a method comprising:
    receiving, from one or more sensors, data indicating an estimation of need for deployment of one or more mobile attenuators;
    performing a collision risk assessment on the data to determine a probability of a potential vehicle collision;
    determining the probability of the potential vehicle collision exceeds a predetermined risk threshold value;
    determining a predicted location for the potential vehicle collision; and
    deploying one or more mobile attenuators to an intercept location that is based on the predicted location of the potential vehicle collision, wherein the intercept location is along a path between a current location of a vehicle and the predicted location of the potential vehicle collision.

16. The computer program product of claim 15, wherein the method performed by the processor further comprises:
    determining a specific pattern for placement of the one or more mobile attenuators, such that the specific pattern is determined as a highest probability to mitigate the potential vehicle collision; and
    instructing the one or more mobile attenuators to arrange at the predicted location in the determined specific pattern.

17. The computer program product of claim 15, wherein the method performed by the processor further comprises:
    depositing one or more impact attenuators from the one or more mobile attenuators at the predicted location of the potential vehicle collision; and
    adjusting heights of one or more impact attenuators to minimize damages to one or more vehicles intercepted by the one or more mobile attenuators.

18. The computer program product of claim 15, wherein the method performed by the processor further comprises:
    receiving updated statistical information for the collision risk assessment from a host device; and
    adjusting algorithms for the collision risk assessment and determination criteria for deployment of the one or more autonomous mobile attenuators.

19. The computer program product of claim 15, wherein the method performed by the processor further comprises:
    determining further immobilization is needed to mitigate the potential vehicle collision; and
    deploying an immobilization unit configured to stop a vehicle.

20. The computer program product of claim 15, wherein the method further comprises:
    receiving an indication that the probability of the potential vehicle collision has been mitigated; and
    returning the one or more mobile attenuators to a docking station.

* * * * *